United States Patent

Sy

[15] 3,685,646

[45] Aug. 22, 1972

[54] TAPE REEL CONTAINER

[72] Inventor: Jose C. Sy, South Norwalk, Conn.

[73] Assignee: Audio Devices, Inc., New York, N.Y.

[22] Filed: July 13, 1970

[21] Appl. No.: 54,235

[52] U.S. Cl. ..............206/65 K, 217/26.5, 220/97 B, 229/2.5

[51] Int. Cl. .......B65d 1/34, B65d 21/00, B65d 81/00

[58] Field of Search .......206/52 R, 52 F, 65 H, 65 R, 206/72; 217/26.5; 220/97 B; 229/2.5

[56] References Cited

UNITED STATES PATENTS

| | | | |
|---|---|---|---|
| 2,233,044 | 2/1941 | Beck | 217/25.5 |
| 2,776,772 | 1/1957 | Itoda | 206/65 K |
| 3,233,728 | 2/1966 | Johnson et al | 206/52 F |
| 3,482,684 | 12/1969 | Schladale | 206/65 R |
| 3,487,919 | 1/1970 | Elliott et al. | 206/65 R |

*Primary Examiner*—William T. Dixson, Jr.
*Attorney*—Pennie, Edmonds, Morton, Taylor and Adams

[57] ABSTRACT

A tape reel container is disclosed which generally includes a tape reel supporting tray having a circular recessed portion which defines a tape reel supporting surface and a raised tape reel mounting plug disposed centrally of the circular recessed portion of the tray. The tape reel supporting tray further includes means adapted to cooperate with an adjacent tape reel container unit for holding said adjacent trays, when arranged in stacked relation, relatively immovable with respect to each other laterally and rotationally.

9 Claims, 7 Drawing Figures

INVENTOR
José C. Sy
BY
[signature]
ATTORNEYS

FIG. 4
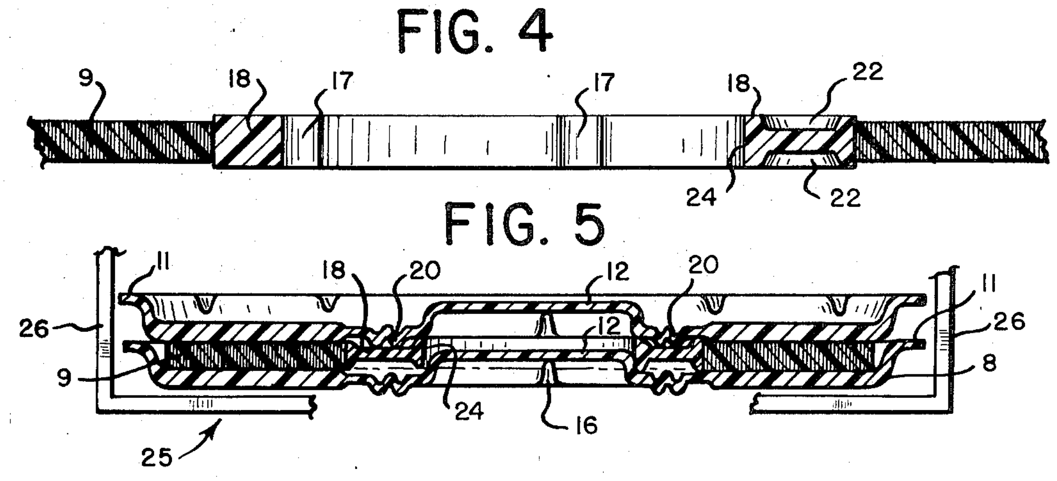
FIG. 4, FIG. 5
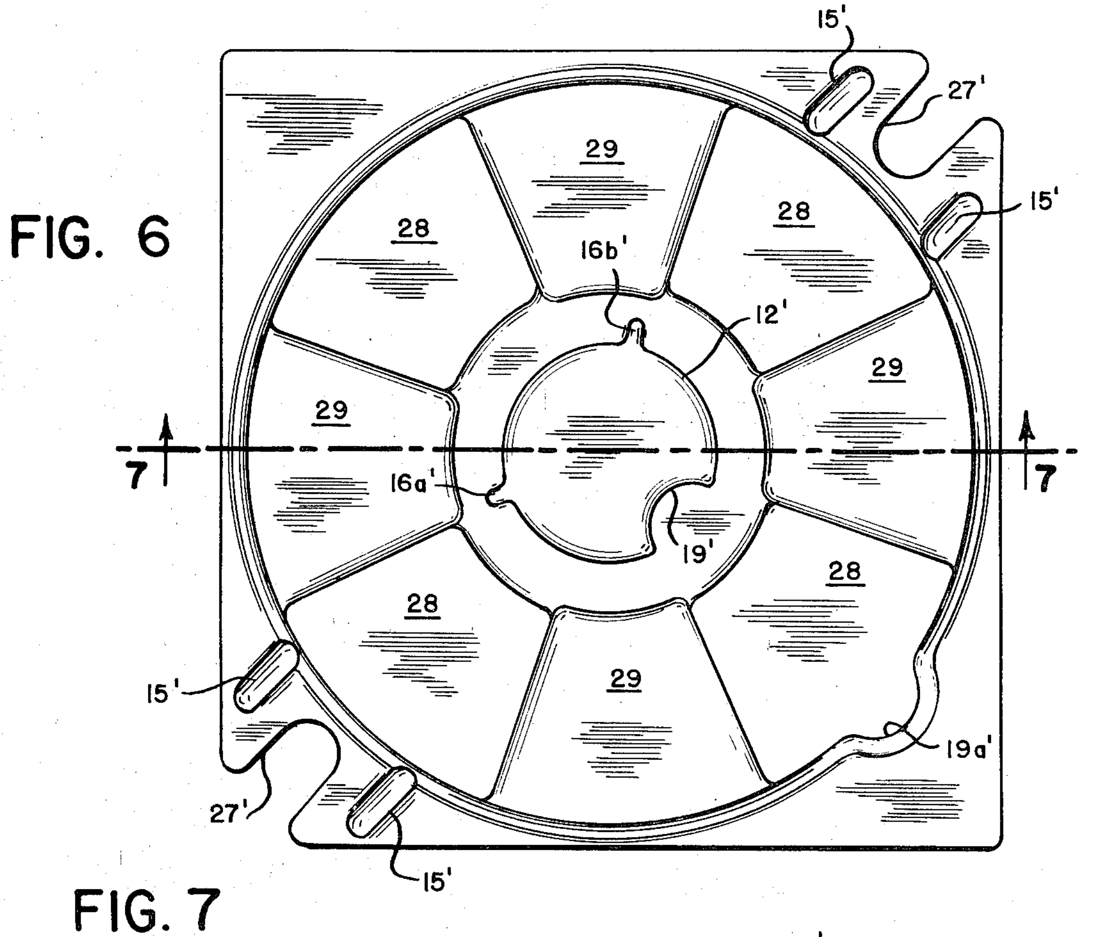
FIG. 6
FIG. 7
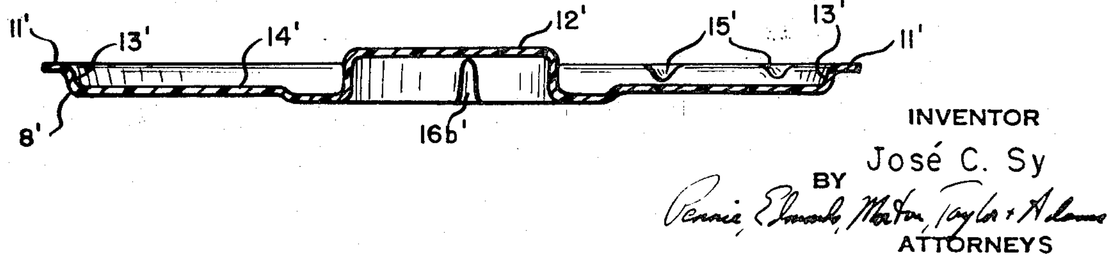
INVENTOR
José C. Sy
BY
Pennie, Edmonds, Morton, Taylor + Adams
ATTORNEYS

TAPE REEL CONTAINER

BACKGROUND OF THE INVENTION

Tape reels for magnetic tape generally comprise a hub member and two flanges which are connected to either side of the hub member. The tape is wound about the hub member between the two flanges to form a reel of tape.

Another type of magnetic tape reel commonly in use comprises a hub member which is not provided with the flanges mentioned above. In the latter instance, the tape is merely wound about the flangeless hub member to form the reel of tape. With flangeless tape reels, tape damage often results due to a phenomenon which is commonly referred as "hub drop" or "telescoping." This phenomenon manifests itself when the wound-up tape accidentally slips or drops off of the hub member causing the tape to become tangled, creased or otherwise damaged. The likelihood of hub drop occurring is significantly increased in instances where the magnetic tape is lubricated in accordance with the requirements of particular applications.

Hub drop occurs most frequently during shipment of flangeless tape reels both during the period of actual transit and after arrival during removal of the tape reels from their packaging. Experience has indicated that hub drop is due for the most part to the nature of the packaging devices in which the flangeless tape reels are contained for shipment purposes.

One common packaging device presently in use comprises a stack of flangeless tape reels between which polyurethane foam sheets are disposed. A die-cut corrugated board is disposed underneath the bottom tape reel and generally at every third or fourth layer of the tape reel stack. A common elongated cylindrical core extends centrally through the tape reel hub members, polyurethane sheets, and corrugated boards to prevent lateral movement between the various tape reels in the stack. Generally, the entire assembly is bound together for shipment as, for example, by placing it in a suitable box or container.

The polyurethane sheets are relatively thin and flexible and provide very little support for the tape wound about the flangeless hub. The polyurethane sheets function primarily as a cushion for the tape reels so that the tape wound about the hub members does not become scratched or creased during transit. It is intended that the primary support function for the tape be provided by the corrugated boards. However, the support provided by these boards is not always sufficient to prevent hub drop especially when the packaging boxes are knocked about or roughly handled during shipment. Also, removal of the flangeless tape reels from this type of package is cumbersome, and unless extreme care is exercised in handling the individual tape reels, hub drop can, and often does, occur.

SUMMARY OF THE INVENTION

In accordance with the teachings of the present invention there is provided a tape reel container; and one which is particularly advantageous for transporting a plurality of tape reels each of which comprises a flangeless hub member about which the tape is wound to form the reel. In construction, the tape reel container includes a tape reel supporting tray having a circular recessed portion and a tape reel mounting plug disposed centrally of the recessed portion. The tape reel mounting plug is cylindrical in shape and is raised above the tape reel supporting surface defined by the circular recessed portion of the tray to thereby extend into the center opening of a tape reel disposed within the circular recessed portion of the tray. Tape reel mounting projections are positioned on the tape reel mounting plug and these projections are adapted to engage in the center opening in the hub member of the tape reel to prevent rotational movement between the tape reel and the tray.

The tape reel supporting tray also includes a first and second depression formed in radially opposed positions with respect to the circular recessed portion of the tray. These depressions provide spaces adjacent the inner and outer periphery of the tape reel into which one may insert his fingers for purposes of lifting the tape reel out of the tray. The tape reel supporting tray is further provided with means adapted to cooperate with an adjacent tape reel or its supporting tray disposed in stacked relation therewith for preventing relative lateral and rotational movement therebetween.

BRIEF DESCRIPTION OF THE DRAWINGS

FIG. 4 is a cross-sectional view taken along the line 4—4 of FIG. 3;

FIG. 5 is a cross-sectional view of two tape reel containers according to the present invention arranged in stacked relationship, each tape reel container being shown in the cross section taken along the line 5—5 of FIG. 1;

FIG. 6 is an elevation view of another embodiment of the tape reel container of this invention; and FIG. 7 is a cross-sectional view of the tape reel container shown in FIG. 6 taken along the line 7—7 of FIG. 6.

DETAILED DESCRIPTION OF THE INVENTION

Figures 1, 2:
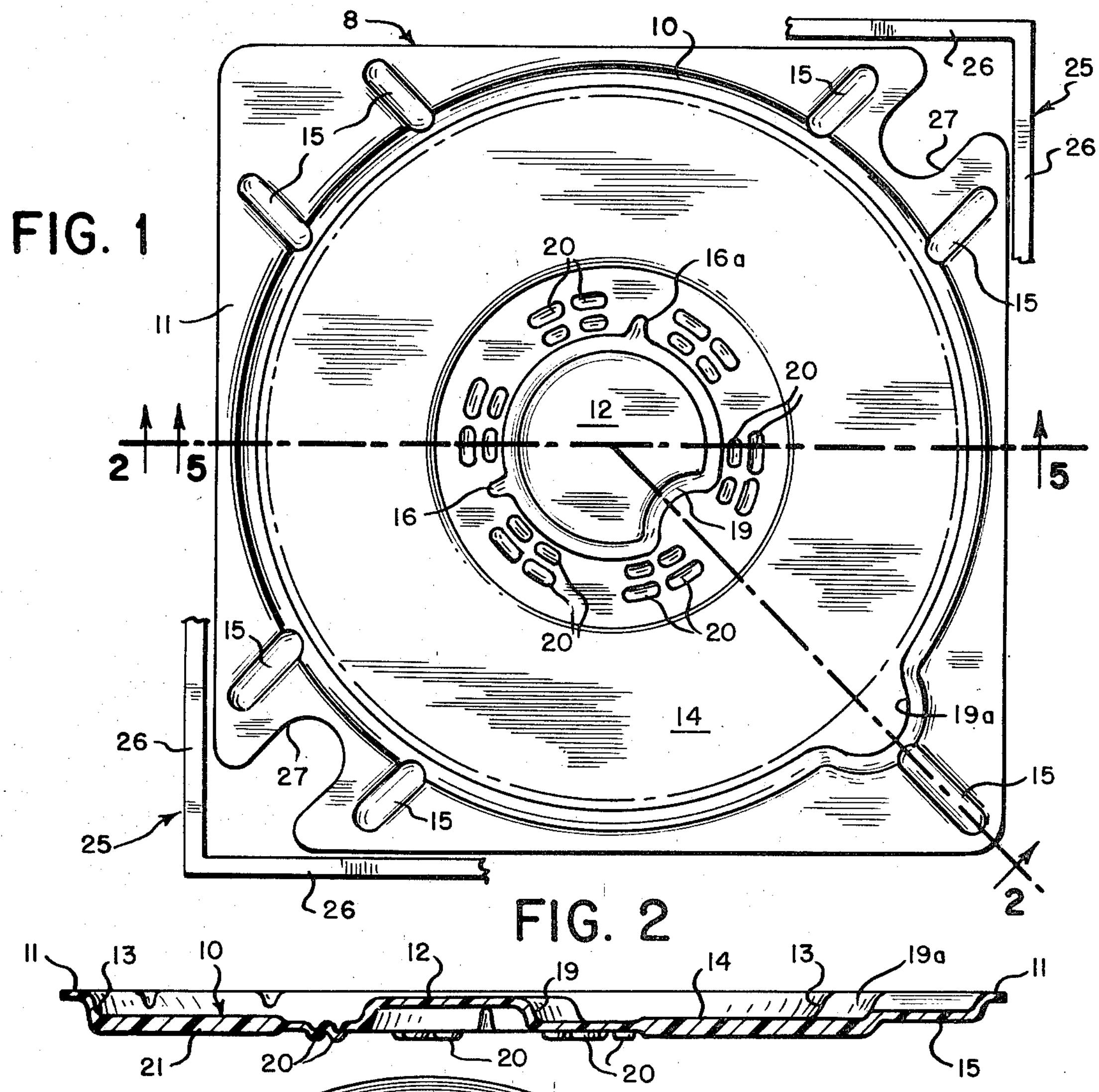
FIG. 1 is an elevation view of one embodiment of the tape reel container of this invention.
FIG. 2 is a cross-sectional view taken along the line 2—2 of FIG. 1.

Referring initially to FIGS. 1 and 2, the tape reel container of this invention includes a tray 8 for supporting a tape reel 9. The tray 8 is made of expanded polystyrene foam which is originally in sheet form. The tape reel supporting tray 8 is formed by placing this polystyrene sheet between two heated dies and pressing the sheet into the configuration presently to be described.

The tray 8 has a circular recessed portion 10 located symmetrically with respect to a generally square flange 11 which borders the recessed portion 10. A raised cylindrical tape reel mounting plug 12 is located centrally of the recessed portion 10 and a vertically oriented rim 13 interconnects the flange 11 and the periphery of the annular tape reel supporting surface 14 defined by the recessed portion 10. Strengthening ribs 15 are formed in the square flange 11 and advantageously in the corner portions of the flange 11 where more surface area is provided for this purpose. In the construction shown in FIG. 1, a pair of parallel strengthening ribs 15 which extend in a generally radial direction into the circular recessed portion 10 is provided in three corners of flange 11. The remaining corner of the flange 11 is provided with a single strengthening rib as shown.

Figure 3:
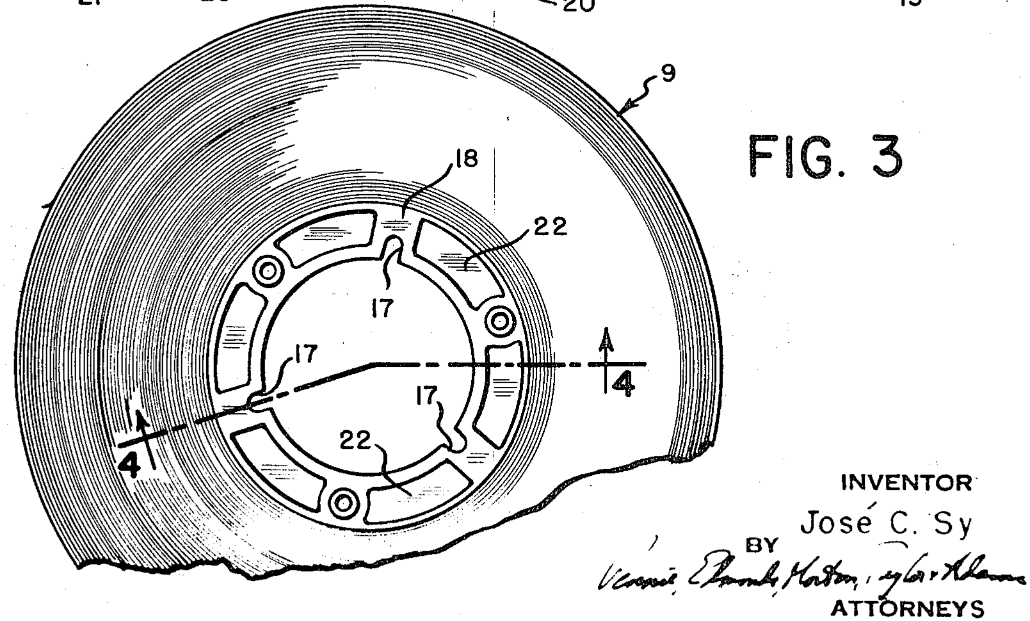
FIG. 3 is an elevation view of a tape reel having a flangeless hub which may be used with the tape reel container of this invention.

The mounting plug 12 is provided with tape reel mounting projections 16, 16*a* which, as best seen in FIG. 3, are adapted to be received in corresponding grooves 17 spaced about the center opening in hub member 18 of tape reel 9. The tape reel mounting projections, thus, prevent rotation between the tape reel and tray. In the construction shown, the tape reel mounting projections 16, 16*a* are spaced apart by an angular distance of approximately 120° as measured in a clockwise direction from projection 16 toward projection 16*a*.

The mounting plug 12 is recessed at a point which is spaced angularly from either of the tape reel mounting projections 16, 16*a* by about 120° to form a depression 19. The rim 13 has a complementary depression 19*a* formed therein which is located radially opposite the depression 19 formed in mounting plug 12. With this arrangement, a tape reel seated within the recessed portion of the tray may be conveniently lifted out of the tray simply by inserting ones fingers into the spaces adjacent the inner and outer periphery of the tape reel provided, respectively, by complementary depressions 19 and 19*a*.

A series of lug portions each comprising a group of individual lug elements 20 project downwardly from the undersurface 21 of the annular tape reel supporting surface 14. These lug element groups are located adjacent the mounting plug 12 in spaced angular relationship with respect to each other. The lug element groups are adapted to be received into corresponding cavities 22 formed in the hub member 18 of an underlying tape reel when multiple tape reel container units according to this invention are arranged in stacked relationship with respect to each other, all of which will be described immediately below.

With reference now to FIG. 5, it will be seen that two tape reel containers according to this invention are arranged in stacked relationship, the upper tape reel container being empty for purposes of clear description only. As shown, the tape reel 9 is disposed within the recessed portion 10 of the lower tape reel supporting tray 8 with mounting plug 12 extending into the center opening 24 in hub member 18. In this condition, it will also be recognized that the tape reel mounting projections 16, 16*a* are received in grooves 17 in hub member 18. Thus, as mentioned above, tape reel 9 is held against rotational movement with respect to tray 8. Due to the fact that mounting plug 12 extends into hub member 18, lateral movement between the tape reel 9 and tray 8 is also prevented irrespective of whether rim 13 closely embraces the outer periphery of tape reel 9.

Relative lateral and rotational movement between the two stacked tape reel containers shown in FIG. 5 is prevented by the interfitting of the lug elements 20 depending from the undersurface 21 of the annular tape reel supporting surface 14 of the upper tray into the cavities 22 in the hub member 18 of the tape reel 9 supported in the lower or underlying tray. Thus, adjacent trays in the stack are held against relative movement as is each tape reel with respect to the tray in which it is supported.

The stack of tape reel containers shown in FIG. 5 forms a box-like unit which may be placed in a suitable box or crate for shipment purposes. A suitable box for this purpose is indicated generally by reference numeral 25. It will be noticed that the side walls 26 of box 25 generally lie closely adjacent the edges of flanges 11 of the nested trays in the stack order to save space and weight. In order to facilitate removal of each tape reel container from such a box, cutouts 27 are formed in the flange 11 of tray 8 at diametrically opposed points with respect to the circular recessed portion 10. In the construction shown in the drawings, these cutouts 27 are formed in opposite corners of flange 11 between the respectively situated pair of strengthening ribs 15. With this arrangement, each tape reel container may be removed from the box 25 simply by grasping the edges of cutouts 27 and lifting the tray 8 and tape reel 9 supported thereon out of box 25.

A modified embodiment of the tape reel container of this invention is shown in FIGS. 6 and 7. Here, the various parts of the tape reel container are given the same reference numerals as used in the embodiment shown in FIGS. 1–5 followed by the suffix ('). As shown, the tape reel supporting surface 14' of tray 8' is formed with a series of alternate depressed and elevated portions 28 and 29, respectively. The elevated portions 29 provide cushions for a tape reel supported thereon.

The tape reel mounting plug 12' of tray 8' extends above the level of flange 11' and also above a tape reel (not shown) contained in tray 8'. With this arrangement, mounting plug 12' is adapted to fit into the hollow under portion of the mounting plug of a tray (not shown) located immediately thereabove in a stack of tape reel container units with the depressions 19' in the telescoped mounting plugs being disposed in mating engagement with respect to each other. Due to the interfitting relationship established between the mounting plugs of adjacent trays in the stack of tape reel containers, relative lateral and rotational movement between adjacent trays is prevented.

The tape reel container of the present invention is particularly advantageous when used to transport tape reels comprising flangeless hub members such as the one illustrated in the drawings. First of all, it will be recognized that the tape wound about the flangeless hub member is fully supported at all radial points by the annular tape reel supporting surface of the tray construction. This is true both during transit and during removal of the tape reels from the box in which they were contained for shipment. Thus, there is virtually no danger of damaging "hub drop" occuring during these stages.

The tape reel container of the present invention also provides a convenient means for lifting the tape reels from their supporting trays. This helps to insure that the tape reels will be properly handled with due caution so that "hub drop" does not occur at this stage in the handling.

The nested interlocking relationship which may be obtained between adjacent tape reel container units when several tape reels must be shipped to the customer in bulk quantities advantageously prevents the individual containers from moving about relative to one another during transit thus avoiding damage to the exposed tape which is wound about the flangeless hub members. When arranged in a stack, it will be understood that each tape reel in the stack is fully protected on all sides from contact with foreign objects which might damage the tape.

In addition, the tape reel container of the present invention is simple in construction and therefore it may be manufactured efficiently and inexpensively. Moreover, the use of polystyrene foam allows the tape reel container to be produced by a simple thermopressing operation and provides a built-in cushioning for tape reels because of the inherent resiliency of such material.

I claim:

1. A tape reel container comprising:

a. a tape reel supporting tray adapted for use in a stack of tape reel container units, said tray having:
   1. a circular recessed portion defining a tape reel supporting surface;
   2. a flange member bordering upon the circular recessed portion;
   3. a vertically oriented rim interconnecting the flange member and the outer periphery of the tape reel supporting surface;
   4. a raised cylindrical tape reel mounting plug disposed centrally on the circular recessed portion;
   5. at least one tape reel mounting projection extending laterally outwardly from the mounting plug for engaging the hub member of the tape reel to prevent rotational movement between the tape reel and the tray;
   6. first and second depressions formed, respectively, in the mounting plug and rim and located radially opposite each other with respect to the circular recessed portion of the tray; and
   7. means adapted to cooperate with an adjacent reel container unit in said stack for preventing relative lateral and rotational movement between said adjacent trays.

2. The tape reel container according to claim 1 wherein:

a. said tray is of unitary construction formed of pressed expanded polystyrene foam.

3. The tape reel container according to claim 2 wherein said tray includes:

a. first and second cutout portions in the flange member of the tray, said cutout portions being located diametrically opposite to each other with respect to the circular recessed portion of the tray; and b. reinforcing indentations disposed on opposite sides of each of said cutout portions.

4. The tape reel container according to claim 3 wherein:

a. said flange member has a generally square configuration; and b. said cutout portions are formed in opposite corners of the square flange member.

5. The tape reel container according to claim 4 wherein said means for preventing relative lateral and rotational movement between adjacent trays in the stack comprises:

a. projecting portions on the tray aligned to engage with the hub member of the tape reel supported in the next adjacent tray in the stack.

6. The tape reel container according to claim 1 wherein said projecting portions comprise:

a. at least one lug portion depending from the undersurface of the tape reel supporting surface of the tray for engagement in at least one cavity formed in the hub member of said underlying tape reel.

7. The tape reel container according to claim 6 wherein:

a. each lug portion includes a plurality of individual spaced lug elements arranged in a group, each lug elements of said group being adapted to fit into the same cavity of the hub member of the underlying tape reel.

8. The tape reel container according to claim 1 wherein said means for preventing relative lateral and rotational movement between adjacent trays in the stack comprises:

a. projecting portions on one side of said tray aligned to engage with complementary shaped recesses in the next adjacent tray of the stack, said projecting portions of each tray forming the complementary shaped recesses on the other side of said tray.

9. The tape reel container according to claim 8 wherein said projecting portions comprise:

a. the mounting plug of adjacent trays with the mounting plug of one tray extending above the tape reel supported thereon and into the hollow underportion of the mounting plug of said next adjacent overlying tray.

* * * * *